Aug. 10, 1948.    L. GRUNDNER    2,446,922
WELDING SPATTER PREVENTION
Filed Nov. 3, 1944
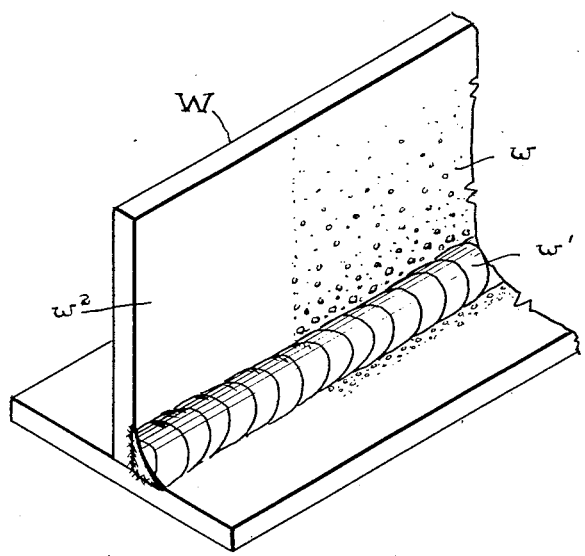
INVENTOR.
LOUIS GRUNDNER
BY
Oberlin & Limbach
ATTORNEYS Patented Aug. 10, 1948

2,446,922

UNITED STATES PATENT OFFICE 2,446,922

WELDING SPATTER PREVENTION

Louis Grundner, Cleveland, Ohio, assignor to The Lincoln Electric Company, Cleveland, Ohio, a corporation of Ohio Application November 3, 1944, Serial No. 561,754

5 Claims. (Cl. 117—6)

In welding operations, and particularly in welding by means of the electric arc, any spattering of the resulting molten metal on adjacent surfaces of the parts being welded is objectionable for the reason that the spattered particles, due to the highly heated condition of such molten metal, will adhere to such surfaces.

Since it is not practical to eliminate the spattering and since the removal of such adhered particles and refinishing of the surfaces in question is a difficult matter and involves additional expense, it has become customary to apply to the surfaces of the parts adjacent the welding operation a coating designed to prevent adherence of spattered particles of molten metal.

While a number of different compounds have been proposed for this use, including varnish, soap solutions, oil, and a water suspension of an inorganic material such as silica or bentonite, none of these have proved entirely satisfactory. Thus the varnishes heretofore used, in order to permit their being applied, require to be admixed with an oil or other inflammable ingredient which constitutes an obvious fire hazard, and, furthermore, will evaporate upon exposure to the air so that the mixture presently becomes unusable. The soap solutions which have been used, aside from being only partially effective to prevent adherence of the spattered particles, are of course alkaline in character and thereby unfavorably reactive to subsequent paint films and any coating thereof accordingly has to be removed before the surface can be painted over. The available oils, aside from being inflammable to a degree, in any event produce smoke where brought in contact with the arc, and their use results in the introduction of carbon into the weld which is objectionable, particularly where the parts being welded are of stainless steel or the like, and especially in certain types of stainless steel deposition, wherein the carbon content of the weld is restricted to a certain maximum percentage. Finally, the suspensions of inorganic materials referred to tend to settle out and do not give complete protection when applied, due probably to the discontinuity of the crystalline nature of the chemicals employed.

The object of the present invention is to provide a spatter prevention compound which will overcome the several difficulties noted above as inherent in compounds of this type heretofore known. In particular, the present improved compound may be easily and readily dispersed in water for the purpose of application by means of brushing, painting or spraying to the surface requiring treatment; it will also be non-inflammable; the applied film is a highly effective preventative against welding spatter adhesion; and finally, following its application to such surface, it can be readily removed. Other desirable qualities of such compound will be pointed out in the course of the following description.

To the accomplishment of the foregoing and related ends, said invention, then, consists of the means hereinafter fully described and particularly pointed out in the claims.

The following description and annexed drawing set forth in detail certain approved compositions of matter and methods of employing the same, such disclosed compositions and steps constituting, however, but several of various ways in which the principle of the invention may be used.

In said annexed drawing, the single figure there appearing is a perspective view of a workpiece comprising angularly related metal parts joined together by a fillet weld and showing the difference in the effect of spattering where my present improved composition is employed, as will now be described.

The basic ingredient in such composition is a resinate of one of the alkaline metals, viz. potassium resinate or sodium resinate, preferably the former. As is well known, such resinates may be made from natural resins derived from various sources; however, the more usual source is rosin or colophonium, the residue from the distillation of turpentine. Abietic acid has been isolated from such resin and the resinate of present interest may be accordingly considered, in part at least, a salt of such acid. However, the term resinate as herein used is intended to connote the commercial product irrespective of its particular source or mode of derivation.

In order to utilize such alkaline metal resinate as a coating for metal parts for the purpose of preventing spattered particles from adhering thereto, such resinate is agitated in water, either plain or distilled, to form an aqueous suspension, dispersion and/or emulsion. While the amount of the resinate may vary through a fairly wide range, I have found in order to obtain effective results that the proportion thereof to the water should be from 5% to 25%, and a very satisfactory composition is provided by using 15 parts of potassium resinate and/or sodium resinate and 85 parts of water of weight. If desired, in order to facilitate the dispersion of the resinate in the water, a small amount of an emulsifying agent, such as petroleum sulphonate, may be added to the mixture of the two main ingredients. Also such dispersion may be increased and the suspension rendered more permanent by homogenizing treatment of the mixture.

The resulting composition is a white milk-like fluid of smooth consistency which may be readily applied to the surface to be treated by brushing or spraying, and upon evaporation even partially of the water vehicle the composition becomes quite tacky, adheres tenaciously to the metal surface, and covers such surface in the form of a continuous uniform film.

The resultant film, even where the resinate component is in the lower portion of the above indicated range, has been found highly effective in preventing the adherence of spattered particles to the metal surface coated with the composition. Thus, as illustrated in the accompanying drawing, whereas numerous spattered particles will remain firmly attached with the uncoated area $w$ of the work-piece $W$ following the laying down of the bead $w'$ by an arc welding operation, the adjacent area $w^2$ coated with my improved composition will be entirely clear of such spatter effect. Such composition may be applied generally to the surface of the parts, including the areas which are interfused during the welding operation, since the composition does not interfere with the latter in any way. Moreover, it is unnecessary to wait for the coating to become dry before proceeding with the welding operation. Finally, after the welding operation, if it is desired to remove the remaining coating, this can be readily done by the use of water or a water-dampened cloth. However, the deposited film is neutral in reaction, the pH of the solution being close to 7. Accordingly, the film need not be removed after the welding operation in order to permit painting of the welded piece.

The composition is not inflammable, so constitutes no fire hazard; moreover, no carbon pick up results from its use, so that it can be employed in connection with the welding of stainless steel just as well as other types of steel. It also has a low surface tension with resulting spreading capacity and economy in use, while due to the non-inflammable character of the vehicle, i. e. water, it is unnecessary to wait for the coating to dry; in fact, welding can proceed immediately after application of the coating, since the arc merely acts to evaporate the water more rapidly. The cost of manufacture, furthermore, is relatively low compared with other compositions heretofore available for the purpose in hand.

It is a matter of indifference whether the composition made up of the ingredients in the manner as hereinbefore described be considered a suspension, dispersion, solution, or emulsion. For convenience in the claims which follow the term "suspension" will be used in an inclusive sense.

Other modes of applying the principle of my invention may be employed instead of the one explained, change being made as regards the process herein disclosed or the materials employed in carrying out the process, provided the step or steps stated by any of the following claims or the equivalent of such stated step or steps be employed.

I therefore particularly point out and distinctly claim as my invention:

1. The method of preventing adherence on a workpiece of spatter from an arc-welding operation, which comprises applying to the surface to be protected a water suspension having a pH not substantially higher than 7 of a resinate containing principally an alkali metal salt of abietic acid, the water being readily evaporable to leave a thin adherent film of such resinate on such surface.

2. The method of preventing adherence on a workpiece of spatter from an arc-welding operation, which comprises applying to the surface to be protected a water suspension having a pH not substantially higher than 7 of an alkali metal resinate derived from the residue of turpentine distillation, the water being readily evaporable to leave a thin adherent film of such resinate on such surface.

3. The method of preventing adherence on a workpiece of spatter from an arc-welding operation, which comprises applying to the surface to be protected a water suspension having a pH not substantially higher than 7 of an alkali metal resinate derived from the residue of turpentine distillation wherein such resinate constitutes from 5% to 25% by weight, the water being readily evaporable to leave a thin adherent film of such resinate on such surface.

4. The method of preventing adherence on a workpiece of spatter from an arc-welding operation, which comprises applying to the surface to be protected a water suspension having a pH not substantially higher than 7 of an alkali metal resinate derived from the residue of turpentine distillation wherein such resinate constitutes from 5% to 25% by weight, together with a relatively small percentage of an emulsifying agent, the water being readily evaporable to leave a thin adherent film of such resinate on such surface.

5. The method of preventing adherence on a workpiece of spatter from an arc-welding operation, which comprises applying to the surface to be protected a water suspension having a pH not substantially higher than 7 of an alkali metal resinate derived from the residue of turpentine distillation wherein such resinate constitutes approximately 15% by weight, the water being readily evaporable to leave a thin adherent film of such resinate on such surface.

LOUIS GRUNDNER.

REFERENCES CITED

The following references are of record in the file of this patent:

UNITED STATES PATENTS

| Number | Name | Date |
|---|---|---|
| 1,303,782 | Dugan | May 13, 1919 |
| 1,672,377 | Exley | June 5, 1928 |
| 2,242,289 | De Laney | May 20, 1941 |
| 2,242,529 | Langmeier | May 20, 1941 |
| 2,250,940 | Zahn | July 29, 1941 |